Sept. 22, 1925. 1,554,423
J. A. DRIY ET AL
AUTOMATIC CUT-OUT FOR ELECTRIC MOTORS
Filed March 7, 1921
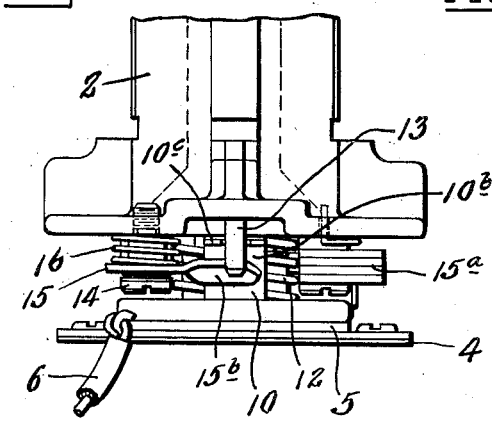
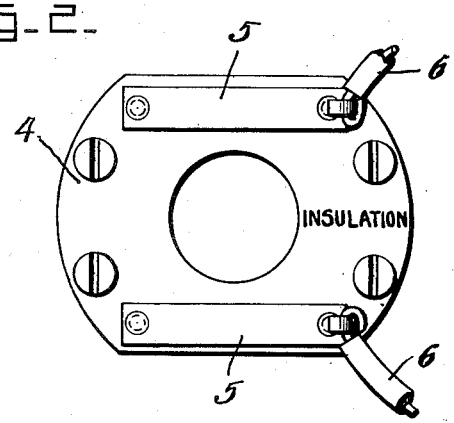
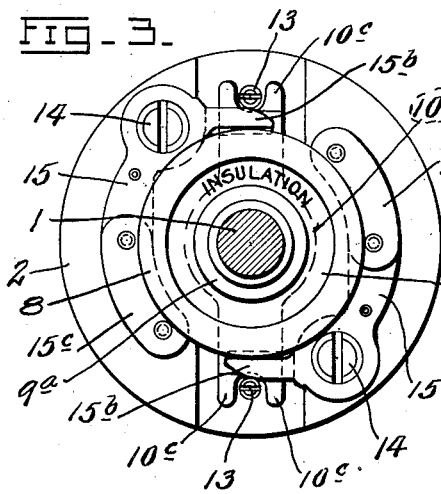
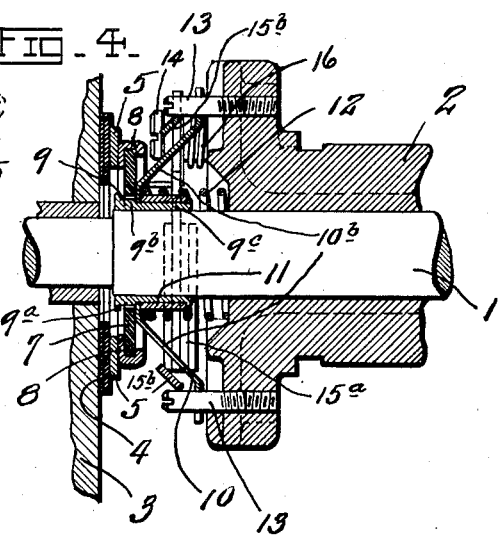
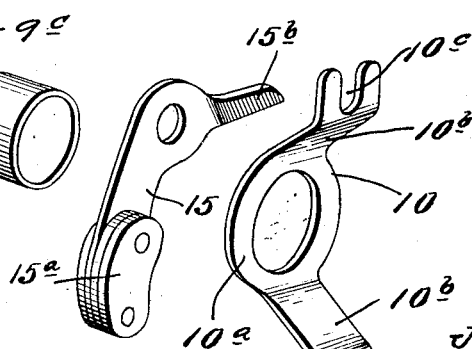
Inventors
John A. Driy
Joseph J. Janca
By Patented Sept. 22, 1925.

1,554,423

UNITED STATES PATENT OFFICE.

JOHN A. DRIY AND JOSEPH J. JANCA, OF ST. LOUIS, MISSOURI, ASSIGNORS TO THE EMERSON ELECTRIC MANUFACTURING COMPANY, OF ST. LOUIS, MISSOURI, A CORPORATION OF MISSOURI.

AUTOMATIC CUT-OUT FOR ELECTRIC MOTORS.

Application filed March 7, 1921. Serial No. 450,131.

*To all whom it may concern:*

Be it known that we, JOHN A. DRIY and JOSEPH J. JANCA, citizens of the United States, residing at St. Louis, Missouri, have invented a certain new and useful Improvement in Automatic Cut-Outs for Electric Motors, of which the following is a full, clear, and exact description, such as will enable others skilled in the art to which it appertains to make and use the same, reference being had to the accompanying drawings, forming part of this specification, in which—

Figure 1 is a top plan view of the improved cut-out.

Figure 2 is a front elevational view of the same.

Figure 3 is an elevational view of the contact plate.

Figure 4 is a vertical sectional view.

Figure 5 is a view of some of the parts in detail.

This invention relates to a new and useful improvement in cut outs for electric motors, the object being to provide a simple and efficient structure of the character described which will open the phase or starting winding after the motor has reached a predetermined speed and at which the motor will have sufficient torque for the main winding to pull the load to speed. Without a starting winding, a single phase induction motor has no starting torque, but after it reaches a certain speed, it has sufficient torque to pull the load, and therefore, as the starting winding is no longer needed in the circuit, it can be cut out.

In the drawings, 1 indicates the armature shaft, 2 a part of the core or hub of the armature, and 3 a part of the motor frame. 4 is an insulation plate mounted on the motor frame and providing a mount for stationary contact strips 5 to which are electrically connected wires 6 of the phase or starting winding, not shown. 7 indicates a fibre insulation ring which carries a contact ring 8, preferably coined over its edges, and which is adapted, when in contact with the strips 5 to close the starting winding circuit, as when the motor is at rest; but which, when moved away from the contact strips, will cut-out or open-circuit the starting winding, as when the rotor reaches or exceeds a predetermined speed.

9 indicates a sleeve which may be loosely mounted on the armature shaft, and which sleeve has a flange $9^a$ at one end, an enlarged cylindrical portion $9^b$ adjacent said flange, and a reduced cylindrical portion $9^c$ forming a shoulder $9^d$. Ring 7 is loosely mounted on portion $9^b$ and may be said to "float" in that it readily accommodates itself in making contact with the strips 5 despite possible manufacturing inequalities. 10 indicates a cam plate consisting of a central ring portion $10^a$ (designed to fit against the shoulder $9^d$) and oppositely diverging and flaring inclined track members $10^b$, at whose extremities are guiding notches $10^c$. 11 indicates a sleeve member arranged on the reduced cylindrical portion $9^c$ and against the ring portion $10^a$ of the cam plate for holding the latter in position, said sleeve 11 being held in position by coining over the end of sleeve 9, as shown in Figure 4. The floating ring 7 therefore, while free to rotate on sleeve portion $9^b$, and free to move slightly longitudinally along the sleeve, is nevertheless confined between the flange $9^a$ and the ring portion $10^a$ of the cam member 10. 12 indicates a coiled spring on the armature shaft and between a shallow centering recess in the armature hub, and the ring portion $10^a$. The purpose of this spring is to force the sleeve 9 and its carried parts, including the contact ring 8, away from the armature, when the motor is at rest, or at a predetermined speed, so that the ring 8 will connect the strips 5. 13 indicates guiding and driving pins mounted in the armature hub and received in the notches $10^c$ at the ends of the cam tracks.

14 indicates stud screws also mounted in the armature hub and circumferentially displaced with respect to the pins 13, said stud screws providing a pivotal mount for two weighted bell-crank levers 15, each of said levers having an overbalanced or weighted end $15^a$ and a bent or twisted tail portion $15^b$, the latter extending in the transverse plane of a cam track $10^b$. 16 is a torsion spring on stud 14, connected at one end to the armature and at its other to the lever 15, and whose function is to tend to hold the tail portion $15^b$ outwardly away from the cam track. There is a torsion spring 16 for each lever 15.

In operation, when the motor is at rest, the parts occupy positions as shown in Figure 4, in which the strips 5 connected to the starting winding are connected. When the motor starts operating, the first action of levers 15, when the weighted ends thereof move outwardly, is to move their tail pieces into contact with the cam tracks, after which, when the speed of the armature increases, said tail pieces will be further forced inwardly, and cause the cam tracks, which they now engage, to move toward the armature, compressing spring 12, and carrying with them the sleeves 9—11 and the rings 7—8, the latter being moved out of engagement with the contact strips 5. As long as the armature rotates at high speed, contact ring 8 will remain out of contact with strips 5; but when the motor slows down, in coming to a position of rest, torsion springs 16 will move the weighted ends of levers 15 inwardly. The tail pieces of these levers will move outwardly, releasing the cam tracks, and spring 12 will be free to force the contact ring 8 against strips 5. As shown in Figure 4, the tail pieces 15$^b$ are brought to a position of rest against the guide pins 13, in which position they are entirely away from the cam tracks. While the springs 16 may be dispensed with, their presence is desirable, as all noise of the levers 15 in starting and stopping is thus avoided.

What we claim is:

1. In an automatic cut-out for an electric motor, having an armature and shaft, starting winding contacts, a sleeve on said shaft movable axially thereof, a contact connecting member carried by said sleeve, a cam secured to said member extending outwardly from said sleeve with its outer end engaging said armature so that the cam may slide axially thereof while rotating therewith, and weighted levers pivoted on said armature and engaging said cam to move the same axially of said armature.

2. In an automatic cut-out for an electric motor having an armature and a shaft, starting winding contacts, a contact connecting element movable axially of the shaft to and from contact connecting position, a cam member operatively connected to said element and inclined in an axial plane, a lever member pivoted on the armature with one arm weighted to swing centrifugally transversely of said plane when the armature rotates and with its other arm engaging said cam member to move the same and said element out of contact connecting position.

3. In an automatic cut-out for an electric motor having an armature and a shaft, starting winding contacts, a contact connecting element movable axially of the shaft to and from contact connecting position, a cam member operatively connected to said element and inclined in an axial plane, a lever member pivoted on the armature to swing centrifugally transversely of said plane when the armature rotates to engage said cam member to move the same and said element out of contact connecting position, said cam member and lever member consisting of flat strips lying in nonparallel planes and at least one of which members is bent to oppose a flat surface to the flat surface of the other member.

4. The combination of an armature shaft, a sleeve thereon having a flange and a shoulder spaced therefrom, a cam member, fitting against said shoulder, an encircling sleeve for holding said cam member against said shoulder, the end of the first mentioned sleeve being coined over the end of the second mentioned sleeve, a contact ring carried by said flanged sleeve, and centrifugally operated devices for co-operating with said cam member.

5. In an automatic cut-out for electric motors, starting winding contacts, a floating ring co-operating therewith, a cam member adapted to move said ring out of engagement with said starting winding contacts, a guide pin for said cam member, an overbalanced lever adapted to operate said cam member, and a spring for holding said lever in a position of rest against said guide pin.

6. In an automatic cut-out for electric motors, starting winding contacts, a floating contact ring co-operating therewith, a cam member adapted to move said ring out of engagement with said starting winding contacts, an overbalanced lever adapted to operate said cam member, an abutment, and a spring for holding said lever in a position of rest against said abutment.

In testimony whereof we hereunto affix our signatures this 3rd day of March, 1921.

JOHN A. DRIY.
JOSEPH J. JANCA.